United States Patent [19]

Schoettle et al.

[11] 3,800,322

[45] Mar. 26, 1974

[54] TAPE RECORDER AND MAGNETIC TAPE CASSETTE WITH MOVABLE TENSIONING AND BRAKE MEANS

[75] Inventors: Klaus Schoettle, Ludwigshafen; Joachim Hack, Frankenthal; Gustav Loewenberg; Werner Hoffmann, both of Ludwigshafen, all of Germany

[73] Assignee: Badische Anilin & Soda-Fabrik Aktiengesellschaft, Ludwigshafen/Rhine, Germany

[22] Filed: Aug. 24, 1971

[21] Appl. No.: 174,471

[30] Foreign Application Priority Data

Aug. 25, 1970 Germany ........................ 2041977
July 29, 1971 Germany ........................ 2137939

[52] U.S. Cl. ........... 360/96, 242/55.19 A, 360/128

[51] Int. Cl. ........................ G11b 23/04, G11b 19/22

[58] Field of Search ...... 179/100.2 Z; 274/4 C, 4 D, 274/11 C, 11 D; 242/55, 19 A, 197, 199, 75.3, 75.4; 226/49, 51

[56] References Cited

UNITED STATES PATENTS

| | | | |
|---|---|---|---|
| 3,497,157 | 2/1970 | Hanes et al. | 179/100.2 Z |
| 2,702,834 | 2/1955 | Golle et al. | 179/100.2 Z |
| 3,322,360 | 5/1967 | Roys | 242/55.19 A |
| 3,417,938 | 12/1968 | Markakis et al. | 179/100.2 Z |
| 3,037,093 | 5/1962 | Nowlan | 179/100.2 Z |
| 2,719,884 | 10/1955 | Reed et al. | 179/100.2 D |

FOREIGN PATENTS OR APPLICATIONS

| | | |
|---|---|---|
| 1,178,226 | 9/1964 | Germany |
| 910,602 | 5/1954 | Germany |

*Primary Examiner*—Bernard Konick
*Assistant Examiner*—Alfred H. Eddleman

[57] ABSTRACT

The invention relates to a magnetic tape cassette and a tape recorder for use with such a cassette. More specifically, the invention relates to the provision of movable means within the cassette, which means — in a first position — hold the magnetic tape taut and prevent movement of the reels in the cassette and — in a second position — release the magnetic tape and the reels, which may then be rotated by the tape recorder, the tape being guided only by means attached to the recorder. Magnetic head positioning means provided on the recorder are adapted to adjust the position of magnetic heads, which are rigidly mounted on a head plate which is movable relatively to the tape, to the desired position for recording and reproduction.

11 Claims, 8 Drawing Figures

Figure 1:
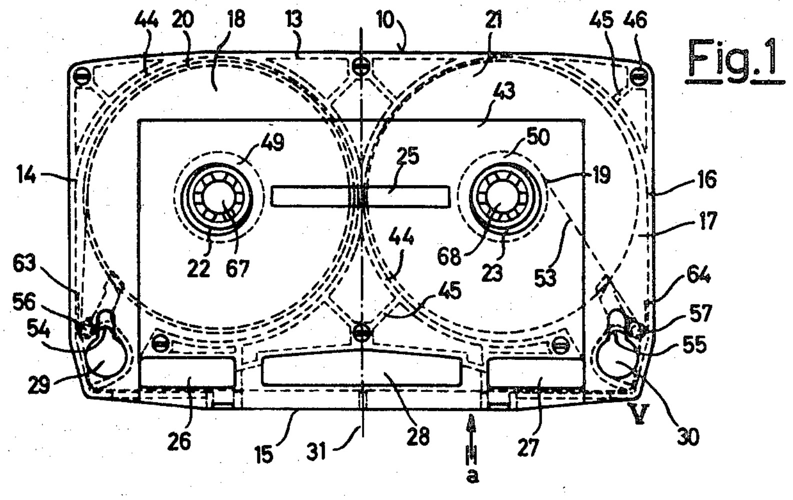

INVENTORS:

KLAUS SCHOETTLE
JOACHIM HACK
GUSTAV LOEWENBERG
and
WERNER HOFFMANN

INVENTORS:
KLAUS SCHOETTLE
JOACHIM HACK
GUSTAV LOEWENBERG and
WERNER HOFFMANN

INVENTORS:
KLAUS SCHOETTLE
JOACHIM HACK
GUSTAV LOEWENBERG AND
WERNER HOFFMANN

TAPE RECORDER AND MAGNETIC TAPE CASSETTE WITH MOVABLE TENSIONING AND BRAKE MEANS

This invention relates to a tape recorder with a magnetic tape cassette, the latter consisting of a substantially rectangular housing having a bottom wall, a top wall and side walls and containing one or more reels adapted to carry packs of magnetic tape, the reels and magnetic tape being driven by spindles and capstans provided on the tape recorder and adapted to pass through openings in the bottom and/or top walls of the cassette, the recording and reproduction of signals after the cassette has been placed in position on the recorder being effected by means of recording or reproducing heads which are provided on the recorder and which, together with at least one pressure roller, are adapted to enter at least one opening in the front wall of the cassette to bear against the mangetic tape passing along said front wall on the inside thereof.

Tape recorders using cartridges enable magnetic tapes to be handled more simply and safely than tape recorders employing reels of tape or tape packs, the handling of which is troublesome and time-consuming and almost inevitably leads to damage to the tape.

The high-quality tape recorders used in the studio or for data processing are very exacting as regards tape pace and tape guidance. Desirably, such equipment should be operable by unskilled personnel without the quality of the recording or playback results being impaired.

The prior art includes tape recorders which use reels or packs of magnetic tape and which ensure adequate tape guidance, thus making the recorders suitable for all applications, by the provision of all of the means for guiding and driving the tape in or on the recorder, the magnetic tape being transported between stationary tape guides and magnetic heads. As mentioned above, the disadvantage of such units resides in the time-consuming and difficult handling of the tape, calling for the services of experienced operators.

Cassette recorders are also known, in which the cassettes contain the essential tape guide elements such as tape guide rolls and tape guide pins, the hub bearings and the pressure pads. The cassette housing is usually made of thermoplastics material which is not dimensionally stable to the required high degree when subjected to changes of temperature and humidity, with the result that the tape guide means, which are directly or indirectly connected to the cassette housing, alter their predetermined position in relation to the tape so that the position of the magnetic tape relative to the magnetic heads is also changed. The result of such changes in the position of the heads is poor or even useless recordings so that such cassette recorders are not very suitable for studio or data-processing applications.

Metal-reinforced plastic cassettes are also known. As is well known, the mass production of metal parts within narrow limits of tolerance can only be carried out on precision equipment and is thus very expensive. Subsequent machining of metal parts is hardly practIcable on a mass-production scale and is even more expensive.

Summarizing, it can be said that prior art cassettes are not capable of meeting the high requirements as regards the accuracy and reliability of tape guidance, unless produced at great expense and in relatively small numbers.

It is an object of the invention to provide, whilst avoiding the aforementioned drawbacks of known magnetic tape recording systems, a cassette which can be mass-produced economically and a tape recorder for use with such a cassette, the combination ensuring optimum tape guidance and simplicity of operation with minimum tape damage.

It is a furtherobject of the invention to provide simple means of locating the magnetic heads in a specific position relative to the magnetic tape, said magnetic heads being mounted on a head plate capable of movement towards said magnetic tape, and to ensure the accuracy of such positioning.

According to the invention, the said object is achieved by arranging for the reel guidance and/or tape guidance to be effected exclusively by guide elements mounted on the recorder and independently of the cassette housing, once the cassette has been placed in position on the recorder and the spindles have engaged the reel hubs in preparation for rotation thereof.

The resulting advantages are that the cassette constitutes a protective container for the tape reels right up to the point at which the reels are engaged by the spindles, this protective capability continuing after the cassette has been placed in position on the recorder, and that optimum tape guidance is achieved with only slight structural alterations to conventional tape recorders.

In an advantageous embodiment of the invention, the reels and the tape, when not engaged by the recorder, are held immovable in the cassette housing by holding means, the reels being prevented from turning in at least one direction.

The said holding means prevent the reels from moving freely in the cassette housing during transportation and thus prevent the tape from unwinding, becoming jammed or being damaed in some other manner.

According to a further embodiment of the invention, when the cassette has been placed in position on the recorder and the spindles have engaged the reel hubs in preparation for rotation thereof, the said holding means may be actuated by devices provided on the recorder and entering the cassette through openings in its bottom wall and/or top wall with the result that the reels and the magnetic tape are released.

The devices on the recorder provide a simple way of actuating the holding means such that the reels and tape are not released until just before movement of the reels and tape is possible.

In a further embodiment of the invention, the holding means are in the form of spring-mounted two-armed or three-armed levers located near the front wall of the cassette housing symmetrically with respect to the transverse center axis thereof and adapted to pivot in the plane of the cassette, by means of which levers the reels are held at their flanges and the magnetic tape is held taut in a position parallel to the front wall of the cassette housing.

This measure of holding the magnetic tape taut effectively prevents looping of the tape. Consequently, the tape cannot be damaged by external influences whilst it is also protected from damage within the cassette housing due to jamming.

In an advantageous embodiment of the invention, the tape tensioning levers are each in the form of two hingedly interconnected levers, and a brake member, common to both reels, is located relative to the said interconnected levers such that when the brake member is displaced by means of a pin on the recorder both levers are actuated. This embodiment constitutes a reliable and particularly advantageous solution giving a minimum of tape wear and characterized by ease of production.

In an advantageous design of th movable means in the cassette of the invention, the ratio of the spring load on the tape tensioning levers to that on the brake member as well as the spatial arrangement of the tensioning levers, brake member and actuating pin on the recorder are so selected that when the tape tensioning levers and brake member are moved to their second position the reels are released before the magnetic tape is released by the tensioning levers.

When the means are dimensioned and arranged in this manner, the magnetic tape is readily changed from a taut state to a relatively tensionless state ready for operation in a simple manner and without damage.

In another embodiment of the invention, the said devices on the recorder are rolls, pegs or pins which are arranged relatively to the levers in such a manner that when the cassette is placed in position on the recorder and the reel hubs have been engaged by the spindles of the recorder in preparation for rotation thereof, the levers are actuated so as to release the reels and the tape.

The actuation of the levers may be effected in a very simple manner without any need for expensive mechanisms.

In a further embodiment of the invention, the cassette housing consists, in known manner, of identical halves joined together, the front wall being provided with two openings situated symmetrically on either side of the transverse center axis of the cassette and separated from each other by a reinforcing web and serving to admit the magnetic heads, whilst on the sides of said openings remote from the transverse center axis and separated from said openings by further reinforcing webs containing recesses for the accommodation of magnetic head adjusting means, there are provided, in symmetrical relationship to the transverse center axis of the cassette, further openings for admitting at least one pressure roll mounted on the recorder.

Accordingly, the magnetic heads and pressure rolls may enter the cassette without it being necessary for the cassette housing to be locked to the magnetic heads.

According to a further embodiment of the invention, the bottom wall and the top wall of the cassette housing are provided with openings for the insertion of capstans mounted on the recorder, near which openings further openings are provided for the admission of at least one tape guide element mounted on the recorder and one device for detecting the beginning and end of the tape, and further, a keyhole-shaped opening is provided in each of the bottom and top walls of the cassette above the levers for the accommodation of a tape guide roll mounted on the recorder, the device connected to the recorder for actuating the levers also being located at said point, and a number of small openings or one large opening is provided parallel to the front wall for the accommodation of one or more of the following recorder parts: a tape damping roll, a magnetic head screening shield and a spring-mounted pressure pad.

These features clearly show how simple the design of the cassette can be when the reel guidance and tape guidance are effected by means mounted on the recorder.

According to another embodiment of the invention, the magnetic head screening shields and pressure pads are adapted to conform to any position of the gap in the magnetic head.

In this way, the same cassette may be used on different tape recorders, and the screening shields and pressure pads can be optimally adapted to the number and gap positions of the magnetic heads used.

According to a further embodiment of the invention, the spindles are provided with compression springs in known manner, which springs are compressed in the splined holes in the reel hubs when the cassette is placed in position on the recorder, or, when the cassette has been placed in position, holding means on the recorder are applied to or inserted in the splined holes in the reel hubs, which holding means press down on the reels. These measures constitute a simple way of preventing the reels from changing position relatively to each other and from rubbing against the cassette housing.

It is an important feature of the recorder according to the invention that the magnetic heads are mounted on a head plate which may be moved toward and away from the cassette in known manner and which, after the magnetic heads have entered the cassette, bears against at least two points above and/or below the magnetic tape or tape guide elements mounted on the recorder, thus providing automatic positioning of the magnetic heads relative to the tape.

In this manner, the position of the magnetic head or heads in relation to the tape is fixed simply and reliably. The head gap is thus always in the optimum position in relation to the tape in all three of the possible planes.

It is also proposed that members rigidly mounted on the head plate pass through at least one recess in the front wall of the cassette housing and bear against the tape guide elements at points above and/or below the bottom wall or top wall of the cassette housing.

In a further embodiment of the invention, members rigidly mounted on the head plate pass through recesses in the front wall of the cassette housing to bear against the tape guide elements at points above the magnetic tape, whilst that edge of the head plate which faces the cassette bears against the tape guide elements below the magnetic tape.

Figure 2:
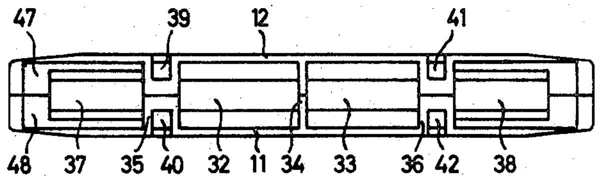
Figures 4, 5:
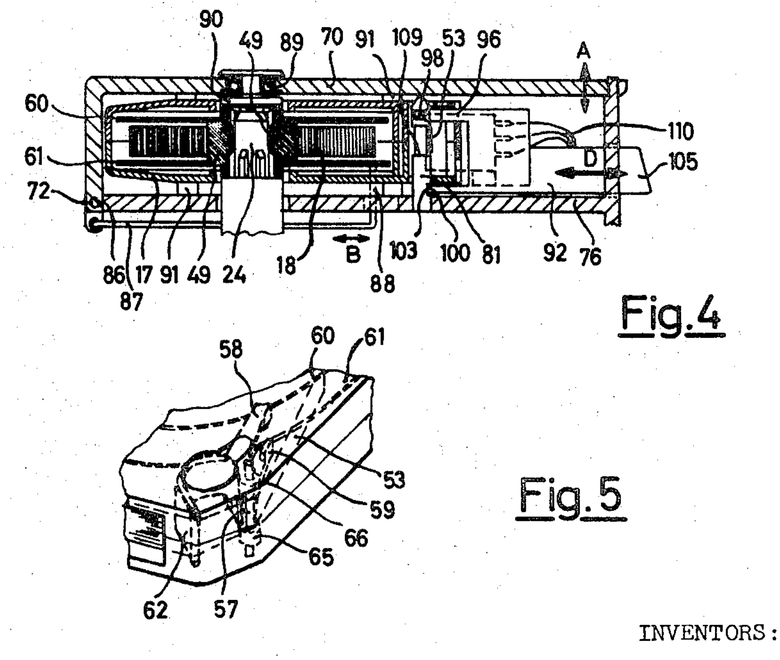
Figure 3:
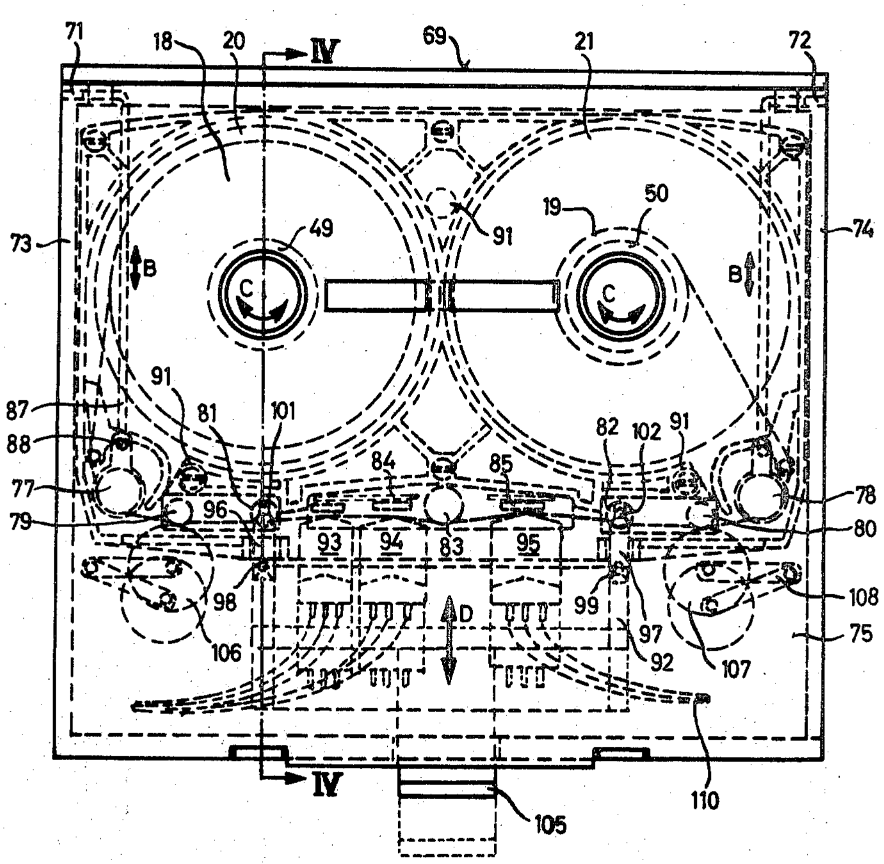
Figures 6, 7:
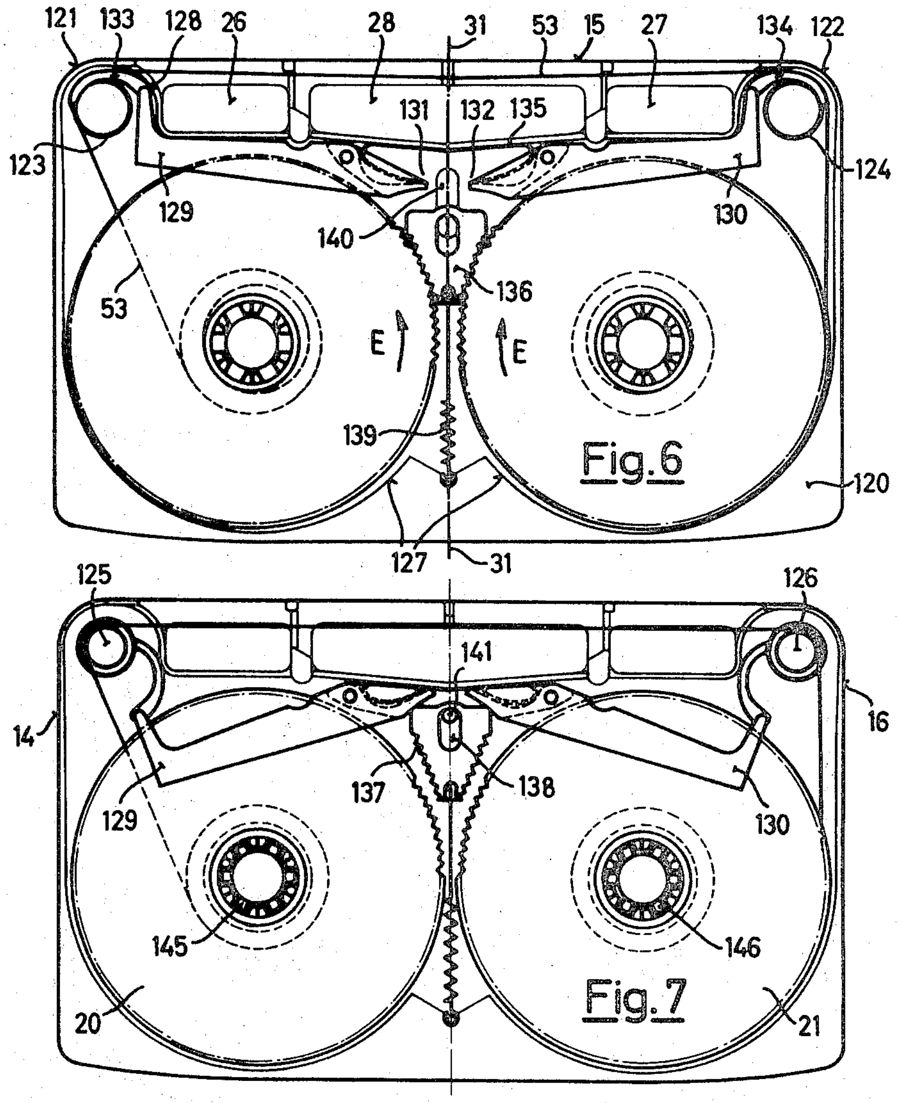
Figure 8:
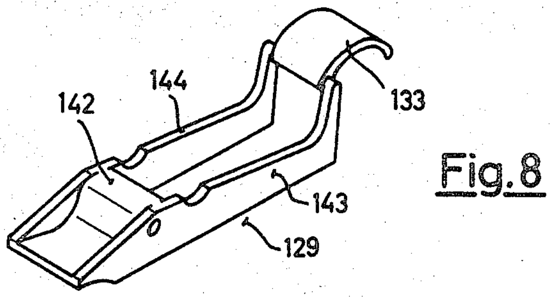

The invention is described in detail below with reference to the accompanying drawings, in which FIG. 1 is a plan view of the magneitc tape cassette of the invention, FIG. 2 is a side view of the cassette shown in FIG. 1, as seen in the direction of the arrow *a*, FIG. 3 is a plan view of a tape recorder showing the cassette of FIG. 1 in the "tape-released" state, FIG. 4 is a cross-section of the top portion of the tape recorder of FIG. 3, taken along the line IV—IV, FIG. 5 is a perspective view of a corner of the cassette of FIG. 1, FIG. 6 is a plan view of the bottom portion of one embodiment of a cassette in the "tape-arrested" state, FIG. 7 is a plan view similar to FIG. 6 but with the cassette in the "tape-released" state, and FIG. 8 is a perspective view, on a larger scale, of a tape tensioning lever as shown in FIG. 6 and 7.

A cassette 10 comprising a substantially rectangular housing 17 having bottom and top walls 11 and 12 respectively and side walls 13 to 16 and made of a polystyrene or some other suitable plastics material, contains reels 20 and 21 carrying magnetic tape packs 18 and 19. The side walls 14 and 16 are partially bevelled toward the front wall 15 when viewed in plan. Each of the bottom and top walls 11 and 12 has circular holes 22 and 23 for the insertion of the winding spindles 24 on the recorder, a rectangular window 25 between said holes 22 and 23, approximately rectangular slots 26, 27 and 28 near the front wall 15 and parallel thereto, and keyhole-shaped openings 29 and 30 in the neighborhood of the bevelled portions of the side walls 14 and 16. The window 25, the holes 22 and 23, the slots 26 to 28 and the openings 29 and 30 are arranged symmetrically with reference to the transverse center axis 31 of the cassette 10, the window 25 and the slot 28 extending on both sides of said axis 31. The front wall 15 has openings 32 and 33 which are also arranged symmetrically with reference to the transverse axis 31 and which are separated from each other by a narrow reinforcing web 34. On the sides of the openings 32 and 33 remote from the axis 31 there are further openings 37 and 38 which are separated from the said openings 32 and 33 by webs 35 and 36. These webs 35 and 36 have recesses 39 to 42 disposed symmetrically relative to the longitudinal center axis of the front wall 15. The area enclosed by line 43 on both the bottom and top walls 11 and 12 is flat, whereas the surfaces outside said area slope gently toward the side walls 13, 14 and 16. Within the cassette housing 17 there are contained reels 20 and 21 located within arcuate ribs 44 integral with the bottom and top walls 11 and 12, the diameter of the ribs being somewhat larger than that of the reels. These ribs 44 meet in the center plane of the cassette housing 17 and serve, as do other ribs 45, to keep the reels in position and to stiffen the housing. Bores are provided at junctions of the ribs 44 and 45 and screws 46 fit in said bores to hold identical halves 47 and 48 of the housing together. The reels 20 and 21 carry, on hubs 49 and 50, the packs of magnetic tape 18 and 19 with the magnetic tape 53 extending therebetween. Three-armed levers 54 and 55 are pivotally mounted near the keyhole-shaped openings 29 and 30 on metal shafts 56 and 57 held by the bottom and top walls 11 and 12. Two arms 58 and 59 located one above of the other in spaced relationship serve to grip the reel flanges 60 and 61, whilst a third arm 62 which is curved round the opening 29 or 30 presses the magnetic tape 53 into the corners of the housing formed between the side walls 14 and 16 and the front wall 15. The pressure required for this purpose is provided by springs 63 and 64 which press against the side walls 14 and 16. Thus the magnetic tape 53 passes from the tape packs 18 and 19 over the shafts 56 and 57, which exhibit a low coefficient of sliding friction, to the arms 62 of the levers 54 and 55 and is held taut between the latter in a position parallel to the front wall 15 of the cassette housing. The shaft 56 passes through cylindrical extensions 65 and 66 (located one above the other in spaced relationship) of the levers 62, which also form guides for the magnetic tape 53, as may be seen in FIG. 5. The arms 58 and 59 of the levers 54 and 55 press the reels 20 and 21 against the arcuate ribs 44 near the side wall 13 in such a way that when the cassette 10 is moved, the magnetic tape 53 cannot unwind and thus form loops which could emerge through the openings 37, 38 and 32, 33 in the front wall 15. The action of the levers 54 and 55 on the position of the reels 20 and 21 can be seen from the position of the splined holes 67 and 68 in the reel hubs 49 and 50 with relation to the circular holes 22 and 23. In this state, the cassette can be transported and stored, etc., as there is no risk of the tape 53 being damaged in any way. FIG. 3 shows the cassette 10 in position on the deck of a tape recorder 69. The reels 20 and 21 and the tape 53 are in the operating position, being engaged by the driving elements of the recorder 69. In order to bring the cassette 10 into this position, a cover-plate 70, which is attached to side walls 73 and 74 of the recorder housing 75 by means of hinges 71 and 72, is swung upwardly (see double arrow A). The cassette 10 may then be placed on a surface 76 of the recorder housing 75, during which process the following parts of the recorder enter the holes, slots and openings of the cassette housing 17: tape guide rolls 77 and 78 enter the keyhole-shaped openings 29 and 30, capstans 79 and 80 enter the rectangular slots 26 and 27 (in which there is also room for tape guide pins 81 and 82 and for means (not shown) for detecting the beginning and end of the tape), a tape damping roll 83 and, on each side thereof, magnetic head screening shields 84 with spring-mounted pressure pads 85 enter the slot 28, and the spindles 24 enter the splined holes 67 and 68 in the reel hubs 49 and 50. Rods 87 are hingedly connected to a bottom edge 86 of the cover-plate 70, the free ends of said rods being bent at right-angles to form vertical pins 88. The latter enter the keyhole-shaped openings 29 and 30 together with the guide rolls 77 and 78, the position of said pins being at the lower end of the slotted portion of the opening such that the pins engage the arms 62 and levers 54 and 55. When the cover-plate is swung from one position to the other, the rods 87 move horizontally in slots (not shown) in the surface 76. When, after insertion of the cassette, the cover-plate 70 is closed, each of the pins 88 is drawn to the top end of the elongated portions of the openings 29 and 30 so that the levers 54 and 55 are moved out of their holding position and the reels 20 and 21 and the tape 53 are released. The operations taking place when the cassette 10 is placed on the recorder are arranged to occur successively to prevent the magnetic tape 53 from being damaged by the elements on the recorder when they enter the openings in the cassette 10. The cover-plate 70 carries ball bearings 89 disposed centrally over the splined holes 67 and 68 in the reels 20 and 21; pin 90 tapered at its end rotates within said ball bearings and extends into the upper part of the splined holes 67 and 68 and rotates therewith when the reels are rotated. This counterbearing prevents the reels 20 and 21, which are freely movable in the cassette housing 17 independently thereof when the levers 54 and 55 have been released, from rubbing against parts of the cassette housing 17 and altering their position relative to each other. The same effect is also achieved by the mere weight of the cover-plate acting on the reels without the counterbearings. The flat surface of the bottom and top walls 11 and 12 of the cassette housing 17, as defined by the line 43, is supported on the recorder 69 by three projections 91. In FIG. 4, two such projections are visible on the cover-plate 17 and two on the base-plate 76.

The double arrows B and C indicate the directions of movement of the rods 87 and thus of the pins 88 and also the directions of rotation of the reels.

The recorder 69 has magnetic heads 93 to 95 mounted on a head plate 92. From the two positions of the head plate 92 and magnetic heads 93 to 95 shown in FIG. 3 in dashed lines it can be seen that the head plate 92 may be moved toward or away from the cassette 10, these movements, which are sliding movements in the present example, being indicated by the double arrow D. Two members 96 and 97 are mounted vertically on the head plate 92 and are parallel thereto. The tips of members 96 and 97 are in the form of pins 98 and 99 which project beyond the front edge 100 of the head plate 92. The vertical distance between these pins 98 and 99 and the head plate 92 is such that when the head plate 92 is urged against the cassette 10, the said pins pass through the recesses 39 and 41 in the cassette housing 17 above the tape 53 to engage in bores 101 and 102 provided in the tape guide pins 81 and 82 on the recorder. In this position of the head plate 92, its front edge 100 rests on grooves 103 in the tape guide pins 81 and 82 below the tape 53. The head plate 92 thus assumes an aligned position with reference to the tape guide pins 81 and 82 on the recorder and automatically positions the magnetic heads 93 to 95 in relation to the tape 53. In this simple manner, the gaps of the magnetic heads 93 to 95 assume optimum positions relative to the tape 53 in all possible planes. When the head plate 92 is pushed toward the cassette 10, as may be readily effected manually by actuation of a sliding member 105 or which may be effected automatically, pressure rollers 106 and 107 are moved into the openings 37 and 38 of the cassette housing 17 by means of levers (not shown) within the recorder 69. The tape 53 in the cassette is thus ready for recording or reproduction. The pressure rollers 106 and 107, each having a swivel arm 108, are also shown in their two positions.

The reference numeral 93 designates an erasing head, 94 a recording head and 95 a reproducing head. The electric leads connected to the magnetic heads are designated by the reference numeral 110.

The tape guide pins 81 and 82 are provided with guides 109. When the cassette 10 is in the position shown in FIG. 3, tape guideance is effected exclusively by guide means on the recorder. If necessary, openings may be made in walls 14 and 16 of the cassette housing 17 near the openings 29 and 30 for the insertion of conventional tape tension sensors or swivelling arms for quick starting and stopping of the tape.

FIG. 6 shows another embodiment of a cassette whose bottom wall 120 is similar in shape to that of FIGS. 1 and 2. In this case, however, the corners 121 and 122 between the side walls 14 and 16 and the front wall 15 are rounded (like parts in FIGS. 1 and 6 have like reference numerals). Circular holes 123 and 124 having a small lip are provided near the rounded corners 121 and 122 approximately concentrically therewith. These holes serve to admit guide rolls 125 and 126. Arcuate ribs 127 serve to stiffen the housing and position the reels, as in FIG. 1. Approximately L-shaped tape tensioning levers 129 and 130 are pivotally mounted on the bottom wall 120 of the cassette in the proximity of the slots 26 to 28. Each of these tensioning levers has a pointed end portion 131 and 132 respectively. Associated with each corner 121 and 122 there is an arcuate guide edge 128 forming a continuation of said corners. Between the holes 123 and 124 and the associated guide edges 128 there are situated comma-shaped levers 133 and 134 of approximately the same radius of curvature as the arcuate guide edges, said comma-shaped levers being hinged to the short limb of the L-shaped levers 129 and 130. In the first position of the tensioning levers 129, 130, as shown in FIG. 6, the comma-shaped levers 133, 134 pass round the lips of the holes 123,124 and thus hold the magnetic tape 53 away from the holes in a position parallel to the front wall. The pointed end portions 131, 132 of the levers 129, 130 extend to near the transverse center axis 31 of the bottom wall 120 of the cassette. The pivot pins of these levers are near said end portions 131, 132, between the reels 20 and 21 and the slot 28. The said end portions 131, 132 are engaged by the two limbs of a leaf spring 135 which bears againgst a rib provided along the slot 28, the L-shaped levers thus being held in their first position. Opposite said leaf spring 135 there is located a wedge-shaped locking or brake member 136 with serrations 137 on each side thereof. This member 136 is situated between the flanges of the reels 20 and 21, and the upper flanges of said reels 20, 21 are provided with corresponding serrations around their edges, as partially indicated in the Figure. For reasons of tolerance and ease of production, the lower flanges of the reels 20, 21 are not provided with serrations but have a radius which is smaller than that of the upper flanges by the distance representing the height of the teeth. The locking member 136 whose height is slightly less than the internal height of the cassette is provided with a slot 138 and a tension spring 139 at its apex, the other end of said tension spring being attached to arcuate ribs 127. In the first position, as shown in FIG. 6, the brake member 136 is in the locking position, in which the reels 20 and 21 are urged against the ribs 127 and the side walls 14 and 16. In this position, the reels can move slightly in the direction of the arrow E but cannot rotate in the opposite direction and consequently the tape 53 cannot unwind. In the position shown in FIG. 6, the slot 138 overlaps a slot 140 in the bottom wall 120 of the cassette to such an extent that a pin 141 on the recorder (see FIG. 7) can enter said slots when the cassette is placed on the recorder. The pin 141 may be connected to a rod hinged to the cover-plate of the recorder like pins 88 in FIG. 4. However, the cover-plate must be hinged to the recorder on the opposite side to that of the cover-plate 70 of FIG. 4. When the cassette is placed on the recorder, guide rolls 125, 126 and spindles 145, 146 enter openings 123, 124 and 22, 23 respectively provided in the bottom and top walls of the cassette housing. The reels 20 and 21 are centered, the locking member 136 being pushed toward the front wall 15. At the same time, the pin 141 enters the slots 138 and 140. In this position therefore, the tape 53 is held slightly taut by the tensioning levers 129 and 130 and the locking member 136. However, when the cover-plate or lid (not shown) of the recorder is closed, the pin 141 is moved a short distance toward the front wall 15 resulting in the reels being released followed by pivoting of the tensioning levers 133 and 134 from their first position due to actuation by the locking member 136. When the lid is opened, the sequence of operations is reversed, i.e. the levers move back into their first position before the locking member 136 has reached its first position, in which it arrests the reels. The temporal spacing of these operations is achieved by using springs 135 and 139 of appropriate force and appropriately dimensioning and arranging the slots 138 and 140 in spaced relationship. This ensures that a sufficient length of tape may be drawn from the reels 20 and 21 to avoid damage to the tape 53 when the levers 133, 134 are moved to their second position, as shown in FIG. 7.

In the operating position of the cassette on the recorder, as shown in FIG. 7, the tape 53 passes around the guide rolls 125, 126 of the recorder and along the tape guide means provided on the recorder and extensing through the slots 26 to 28 in the cassette in the manner described with reference to FIG. 3.

An important difference between the embodiments of the cassette 10 and that of the cassette incorporating the bottom wall 120 is that when the cassette is placed on the recorder, as shown in FIG. 7, no part of the cassette influences tape guidance, whereas in the case of FIG. 3 tape guidance may be slightly influenced by the pivot pins 56 and 57 of the cassette.

Furthermore, the path of the tape in the cassette relative to the capstans 79 and 80 (see FIG. 3) is better in FIG. 7, as the tape is not permanently in contact with the capstans over an arc thereof. Moreover, the design of the cassette is such that production thereof is easier.

The tape tensioning lever 129 is shown on a larger scale in FIG. 8, which shows the owing to the lack of room inside the housing the tensioning levers 129 and 130 comprise members 143 and 144 which are interconnected in spaced relationship by a web 142 such that said levers move above and below the flanges 60, 61 of the reels 20, 21. The comma-shaped lever 133 hinged thereto is made in one piece and has a height which is greater than the width of the tape 53.

In summary, then, the following can be said: The cassette according to the invention may be produced in a simple manner and in large numbers and is sufficiently rigid to be used to advantage for data processing or in the studio. The recorder shows only slight structural changes as compared with prior art recorders, with the result that the magnetic tape in the cassette, when in operation on the recorder, passes the magnetic heads in tbe optimum position as regards accuracy and reliability of tape guidance, this being enhanced by automatic magnetic head positioning means. This means that signals may be recorded and reproduced with great reliability. Further embodiments of the tape recorder and cassettes therefor are conceivable within the scope of the claims, which embodiments are also claimed.

We claim:

1. In combination, a tape recorder and a magnetic tape cassette, said cassette having a substantially rectangular housing having a bottom wall, a top wall and side walls and containing one or more reels adapted to carry packs of magnetic tape, the reels and magnetic tape being driven by spindles and capstans provided on the tape recorder and adapted to pass through openings in the bottom and/or top walls of the cassette, the recording and reproduction of signals after the cassette has been placed in position on the recorder being effected by tape-scanning means on the recorder and which, together with at least one pressure roller, are adapted to pass through at least one opening in the front wall of the cassette to bear against the magnetic tape passing along said front wall on the inside thereof, wherein there are provided in the cassette movable tensioning means for the tape and movable brake means for the reels, and said tensioning means and said brake means being spring-loaded towards a first position so as to assume said position when the cassette is removed from the recorder; said tape tensioning means having two tensioning levers which are hingedly mounted near the front wall of the cassette to pivot in the plane of the cassette, and said reel brake means having two brake portions opposite said two reels, respectively; each of said tensioning levers being located in the first position of said tensioning means, around a corresponding opening in the cassette housing for the admission of a corresponding guide roll on the recorder, in gripping relationship to said tape so as to hold said tape taut in a plane parallel to the front wall of the cassette, and each said brake portion being located, in the first position of said brake means, in flange-gripping relationship to the corresponding reel so as to prevent said reel from turning in at least one direction and wherein there are provided means on the recorder designed to pass through apertures in the bottom wall and/or top wall of the cassette for moving said tensioning means and said brake means, when the cassette is placed on the recorder, to a second position in which said tensioning levers release said tape and said brake portions release said reels and in which reel guidance, and also tape guidance at least along said front wall, are effected exclusively by means, including said guide rolls, provided on the recorder independently of the cassette housing.

2. A magnetic tape cassette as set forth in claim 1, wherein openings are provided in the bottom and top walls of the cassette near its front wall for the joint admission of capstans and tape guide elements, a further opening being provided for the admission of at least one tape damping roll, one magnetic head screening shield and one pressure pad, and further openings are provided in the bottom and top walls for the admission of the tape guide rolls and the actuating pins on the recorder.

3. A tape recorder as set forth in claim 1, wherein said guide means for the reels consist of compression springs provided on the spindles of the recorder, said springs being compressed in the splined holes of the reel hubs when the cassette is placed in position on the recorder and remaining so until the cassette is removed.

4. The combination as set forth in claim 1, wherein said guide means comprise holding means provided on the recorder, which means press down on the reel hubs of the cassette after the latter has been placed in position on the recorder.

5. A tape recorder for use with the magnetic tape cassette set forth in claim 1, wherein members which are rigidly attached to a magnetic-head plate capable of movement toward the magnetic tape moved with said magnetic-head plate to bear against tape guide elements on the recorder, to which end they extend beyond the tape inside or outside openings in those parts of the cassette housing which are adjacent to the front wall of said housing and which protect the magnetic tape.

6. The combination as set forth in claim 1, wherein members rigidly attached to a magnetic-head plate are provided with pins on the recorder which are adapted to firt into bores in the tape guide pins after passing through recesses in the front wall of the cassette housing within parts of the cassette housing and above the magnetic tape, while that edge of the magnetic-head plate which faces the cassette is adapted to fit into grooves in said tape guide pins below the magnetic tape and outside parts of the cassette housing.

7. A magnetic tape cassette which comprises a substantially rectangular housing having a bottom wall, a top wall and side walls and containing one or more reels adapted to carry packs of magnetic tape, said cassette further including openings for accommodating the spindles and/or capstans of a tape recorder, said cassette still further including at least one opening in its front wall for accomodating a tape scanning means and pressure roller carried by said tape recorder, said opening in the front wall being arranged so that said pressure roller bears against the magnetic tape passing along the front wall of said cassette and on the inside thereof; said cassette still further including tensioning means for the tape and brake means for the reels, both said means being movable between a first and second position, said tensioning means and said brake means being spring-loaded towards said first position; said tape tensioning means having two tensioning levers which are hingedly mounted near the front wall of the cassette to pivot in the plane of the cassette, and said reel brake means having two brake portions opposite said two reels, respectively; each of said tensioning levers being located, in the first position only of said tensioning means, in gripping relationship to said tape around a corresponding opening in the cassette housing for the admission of a corresponding guide roll on the recorder, so as to hold said tape in place, and each said brake portion being located, in the first position only of said brake means, in flange-gripping relationship to the corresponding reel so as to prevent said reel from turning in at least one direction.

8. A tape recorder for use with the magnetic tape cassette set forth in claim 7, wherein the tape tensioning levers and the brake portions are moved to their second position by means of pin-carrying rods attached to the cover-plate of the recorder, the pins thereof being adapted to pass through openings provided in the cassette in the bottom and top walls thereof above the tape tensioning levers and the brake member.

9. A magnetic tape cassette as set forth in claim 7, wherein the tape tensioning levers and brake portions are in the form of levers having two rigidly connected arms each, one of which arms is located, in the first position, round the openings for the guide rolls of the records, while the other arm, in said first position, bears against the flanges of the reels.

10. A magnetic tape cassette as set forth in claim 7, wherein the tape tensioning levers are each formed by two hingedly interconnected levers, and a brake member, common to both reels and including said two portions, is located relative to the said interconnected levers such that when the brake member is displaced by means of a pin on the recorder both levers are actuated.

11. A magnetic tape cassette as set forth in claim 10, wherein the ratio of the spring load on the tape tensioning levers to that on the brake member as well as the spatial arrangement of the tensioning levers, brake member and actuating pin on the recorder are so selected that when the tape tensioning levers and the brake member are moved to their second position the reels are released before the magnetic tape is released by the tensioning levers.

* * * * *

UNITED STATES PATENT OFFICE
CERTIFICATE OF CORRECTION

Patent No. 3,800,322 Dated March 26, 1974

Inventor(s) Klaus Schoettle et al.

It is certified that error appears in the above-identified patent and that said Letters Patent are hereby corrected as shown below:

First page, left-hand column, fifteenth line, "2041977" should read -- P 20 41 977.6 --.

First page, left-hand column, sixteenth line, "2137939" should read -- P 21 37 939.5 --.

Column 1, line 19, "mangetic" should read -- magnetic --.

Column 1, line 26, insert -- requirements placed on -- before "high quality".

Column 1, line 61, "practI-" should read -- practi- --.

Column 2, line 38, "damaed" should read -- damaged --.

Column 3, line 8, "th" should read -- the --.

Column 7, line 42, "guideance" should read -- guidance --.

Column 8, line 14, "againgst" should read -- against --.

Column 9, line 8, "extense" should read -- extend --.

Column 9, line 40, "tbe" should read -- the --.

Signed and sealed this 22nd day of October 1974.

(SEAL)
Attest:

McCOY M. GIBSON JR.
Attesting Officer

C. MARSHALL DANN
Commissioner of Patents

ORM PO-1050 (10-69)

USCOMM-DC 60376-P69
★ U.S. GOVERNMENT PRINTING OFFICE : 1969 O—366-334.